United States Patent [19]
Wirth, Jr. et al.

[11] Patent Number: 5,795,110
[45] Date of Patent: Aug. 18, 1998

[54] NO MAR DEPTH STOP

[75] Inventors: John Wirth, Jr.; Jay L. Sanger; Mark K. McCool, all of Casper, Wyo.

[73] Assignee: Woodworker's Supply, Inc., Casper, Wyo.

[21] Appl. No.: 690,980

[22] Filed: Aug. 1, 1996

[51] Int. Cl.$^6$ .................................................. B23B 49/00
[52] U.S. Cl. ...................... 408/110; 408/202; 408/241 S
[58] Field of Search .............................. 408/14, 110, 113, 408/202, 241 S

[56] References Cited

U.S. PATENT DOCUMENTS

| | | | |
|---|---|---|---|
| 2,344,143 | 3/1944 | Harding | 408/202 |
| 2,477,891 | 8/1949 | O'Neill | |
| 2,522,330 | 9/1950 | Wright | 408/113 |
| 2,613,555 | 10/1952 | Schultz | |
| 3,000,239 | 9/1961 | Ransom | |
| 3,320,832 | 5/1967 | Jensen | |
| 4,019,827 | 4/1977 | Christionson et al. | 408/202 |
| 4,168,131 | 9/1979 | Hill | 408/202 |
| 4,993,894 | 2/1991 | Fischer et al. | 408/202 |
| 5,012,708 | 5/1991 | Martindell | |
| 5,078,552 | 1/1992 | Albel | |
| 5,147,164 | 9/1992 | Fraver | 408/202 |
| 5,182,973 | 2/1993 | Martindell | |

FOREIGN PATENT DOCUMENTS

| | | | |
|---|---|---|---|
| 171830 | 2/1986 | European Pat. Off. | 408/202 |
| 577611 | 5/1946 | United Kingdom | |

*Primary Examiner*—Daniel W. Howell
*Attorney, Agent, or Firm*—Cushman Darby & Cushman Intellectual Property Group of Pillsbury Madison & Sutro, LLP

[57] ABSTRACT

A depth stop is provided that is selectively attachable to a cutting tool at an operator-selected location. The end of the depth stop that comes into contact with a work piece during operation is covered with a rotating cap. The cap prevents the work piece from being marred because the cap stops rotating when it comes into contact with the work piece while the cutting tool and the rest of the depth stop continue to rotate. The cap is rotatably mounted on the depth stop by a flange that engages a groove formed in the depth stop. An annular ring is provided between the cap and the end of the depth stop body to facilitate the rotatability of the cap with respect to the body.

20 Claims, 1 Drawing Sheet

5,795,110

1

NO MAR DEPTH STOP

BACKGROUND OF THE INVENTION

1. Field of the Invention

The present invention relates to a depth stop, removably attachable to a cutting tool, such as a drill bit, having a rotatable cap covering one end thereof so as to prevent marring of a work piece when the depth stop comes into contact with the work piece. An annular ring is advantageously disposed between the depth stop body and the cap to facilitate rotation of the cap with respect to the body.

2. Description of the Related Art

Depth stops facilitate precision drilling and boring by regulating the depth to which a drilling or boring tool penetrates a work piece to an operator-selected distance. A typical depth stop includes a body that slips over a cutting, i.e., drilling or boring, tool and is removably attachable to the cutting tool, such as by a set screw extending through the body. The stop is secured to the cutting tool at a selected position which defines the depth to which the cutting tool can penetrate a work piece. The tool can penetrate no further into the work piece when the stop comes into contact with the work piece. Because the stop is fixed to the cutting tool so that it cannot rotate with respect thereto, the stop continues to rotate with the tool when it comes into contact with the work piece, thus marring the face of the work piece. Marring is minimized if the portion of the stop that comes into contact with the work piece is rotatable with respect to the body so that when that portion comes into contact with the work piece, it stops rotating as the body and cutting tool continue to rotate.

Depth stops having rotatable contact structures are known in the art. For example, U.S. Pat. No. 2,447,891 discloses a drill stop with a cylindrical body portion that is attachable to a drill bit and a rotatable collar that is rotatably secured with respect to the body portion by a ball bearing race structure. The ball bearing race structure, however, adds complexity to the device that increases its cost and may reduce its durability.

U.S. Pat. No. 5,078,552 discloses a drill stop which comprises a sleeve which fits over a drill bit and is initially held in place by static friction between the sleeve and the bit. The sleeve has an external shoulder at its bottom end which engages an internal shoulder of a tubular collar which fits over the top of the sleeve. The collar is held in place by means of a snap ring disposed inside the collar below the bottom end of the sleeve. The stop disclosed in the '552 patent has no depth adjustability because the depth is determined by the length of the sleeve. A different length sleeve is needed for a different depth hole. Further, the internal and external shoulders on the collar and sleeve, respectively, and the snap ring assembly adds complexity to the manufacturing and set-up processes.

U.S. Pat. No. 3,000,239 discloses a depth stop for a boring tool having a collar that is rotatable about a shoulder on the boring tool. The contact portion of the stop comprises a pair of legs supported on the collar and extending along the axis of the boring tool for a length governed by the desired depth. While the device disclosed in the '239 patent does not include a ball bearing race structure, the leg structure is cumbersome and is not easily mass-produced, and the entire structure requires for its operation a boring tool having the requisite shoulder structure.

Finally, U.S. Pat. No. 5,182,973 discloses a depth locator apparatus for insert bit holders. An insert bit holder is provided with a depth stop having a work engaging cap comprised of metal or plastic and having an internal circumferential flange which engages an external circumferential groove formed in the depth stop. The cap is free to rotate so that when it engages the work, the depth stop is unlikely to mar the surface. However, the cap can bind when pressed against the work due to friction between the depth stop and the cap, or the cap can bind when the depth stop is not properly installed on the bit holder.

SUMMARY OF THE INVENTION

It is an object of the present invention to avoid the disadvantages of prior art depth stops. Accordingly, the present invention contemplates a depth stop attachable to a cutting tool, such as a drilling or boring tool, to regulate tool depth and which provides a structurally simply yet highly effective freely rotatable cap which will not mar the work piece, is easy to set up, and will not bind. To achieve the foregoing objects, the depth stop of the invention comprises a cylindrical sleeve body having an annular end face and an aperture formed axially through the body through which the cutting tool extends longitudinally. A circumferential groove is formed about an outer periphery of the body. Means for removably securing the body to the cutting tool at a selected longitudinal position along the cutting tool are provided so that the body can be rotationally fixed with respect to the tool. Finally, a rotatable cap is mounted to the body so as to cover at least a portion of the end face and so as to be rotatable with respect to the body about an axis of rotation of the cutting tool. The cap preferably includes a radially extending annular flange seated within the circumferential groove. An annular ring is provided between the cap and the end face to facilitate rotation of the cap with respect to the body.

The depth stop of the present invention is simple in construction. There are no ball bearings; the cap can be installed on the body by simply press fitting the cap over the end face to snap the annular flange into the circumferential groove. Accordingly, the depth stop of the present invention offers a cost effective alternative over prior art depth stops. Furthermore, the annular ring provided between the cap and the body facilitates the rotatability of the cap with respect to the body because friction between the cap and the annular ring is less than friction between the cap and the body.

Other objects, features, and characteristics of the present invention will become apparent upon consideration of the following description and the appended claims with reference to the accompanying drawings, all of which form a part of the specification, and wherein like reference numerals designate corresponding parts in the various figures.

DESCRIPTION OF PRESENTLY PREFERRED EMBODIMENT

Figure 1:
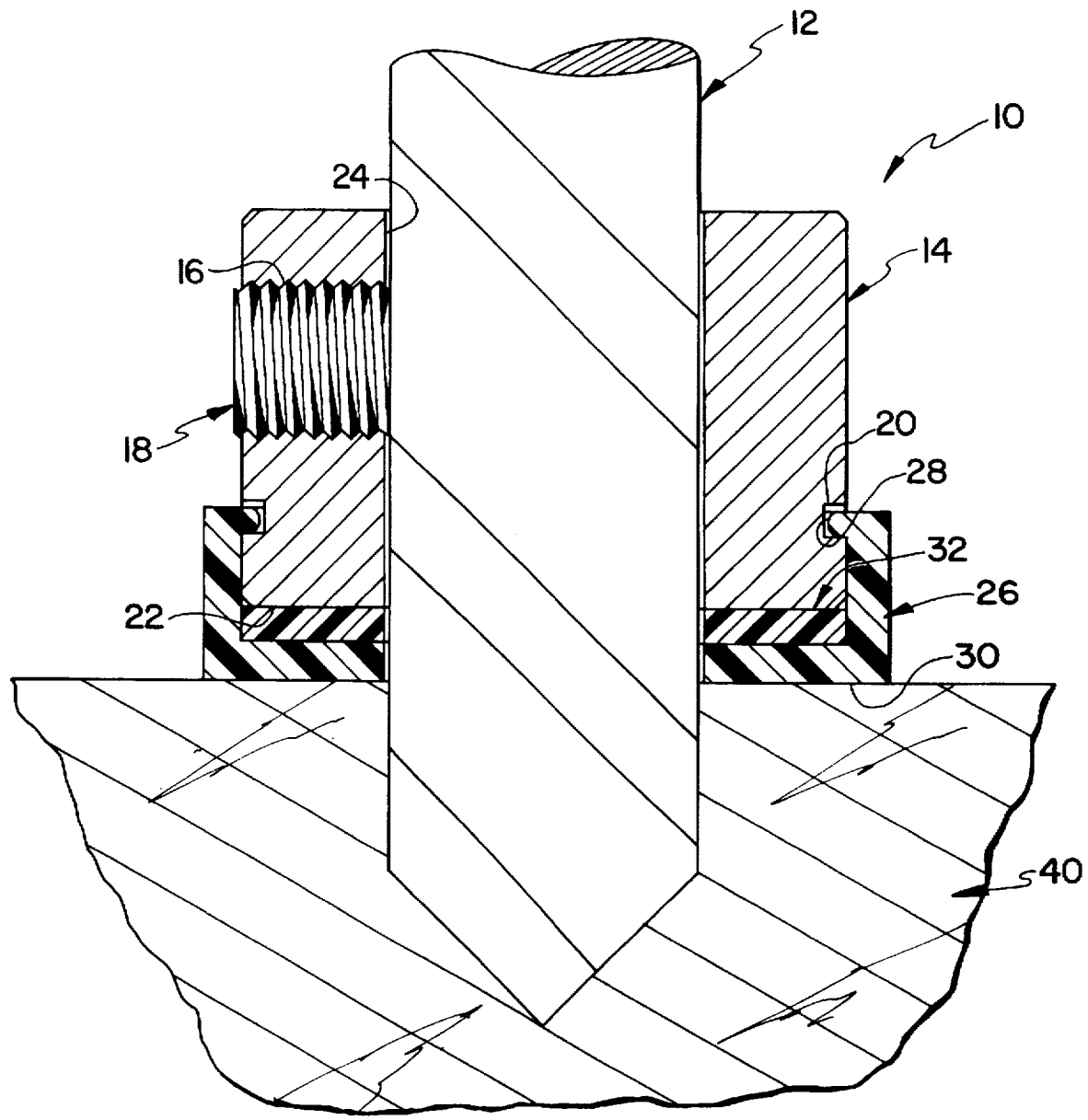
FIG. 1 is a view, partly in cross section, of a depth stop according the present invention mounted to a drill bit.

A depth stop 10 according to a presently preferred exemplary embodiment of the invention is shown in FIG. 1. Depth stop 10 includes a cylindrical body 14 having a bore 24 extending axially therethrough. Body 14 is preferably composed of 303 stainless steel, but could be composed of any material of suitable strength and hardness, such as brass, anodized aluminum, zinc plated low carbon steel, and certain hard plastics.

Depth stop 10 fits over a cutting tool, such as a drilling tool, boring tool, or plug cutter. In FIG. 1, depth stop 10 is shown with a conventional drill bit 12 with the bit 12 extending axially through bore 24. Drill bit 12 is typically secured in a known manner at its shank portion in the chuck of a drill (not shown).

Cylindrical body 14 is preferably secured with respect to drill bit 12 by means of a set screw 18, or the like, extending radially through threaded aperture 16 formed in body 14. Although depth stop 10 is shown having only one set screw, it is contemplated that a depth stop according to the present invention could include more than one set screw. In addition, the body could be secured to the cutting tool by other means, such as, for example, using a locking collet sleeve.

A cap 26 is fitted over one end 22 of body 14. In the preferred embodiment, cap 26 includes a radially inwardly extending circumferential flange 28 formed on the inner surface of the cap 26. Flange 28 is seated within circumferential groove 20 formed about the outer periphery of the body 14 to mount cap 26 to body 14. Flange 28 preferably has a rounded edge as shown in FIG. 1 and is seated within groove 20 by press-fitting cap 26 over end face 22 of body 14.

Alternatively, a flange could be formed on the outer periphery of the body and a mating groove could be formed on the inner periphery of the cap. Flange 28 is preferably loose-fitting within a groove 20 so that cap 26 is rotatable with respect to body 14. Although the flange, whether provided on the cap or the body, is preferably a continuous circumferential flange, a discontinuous flange structure could be adopted instead.

Cap 26 is preferably composed of a polymer having a low coefficient of friction, preferably in the range of 0.04 to 0.10, such as nylon.

An annular ring 32 is most preferably provided between end face 22 of body 14 and cap 26. Annular ring 32 is preferably a washer also comprised of a polymer having a low coefficient of friction, preferably in the range of 0.04 to 0.10, such as nylon, but may also comprise other friction reducing devices, such as a needle thrust bearing. Annular ring 32 facilitates rotation of cap 26 with respect to body 14 when depth stop 10 is pressed against a work piece 40. Rotation is facilitated because the amount of friction between annular ring 32 and the cap 26 is less than that between annular ring 32 and the body 14. Annular ring 32 may bind when there is an axial force applied against cap 26, but cap 26 will be less likely to bind under such axial force.

Best results are achieved if the flange 28 enjoys a non-interfering fit within groove 20.

Specifically, groove 20 and flange 28 should be sized and configured so that flange 28 does not contact groove 20 when cap 26 is under an axial thrust force from work piece 40. All axial bearing force applied against bottom surface 30 of cap 26 will be received by annular ring 32 and end face 22 of body 14. If the flange 28 bears against the sides of groove 20, cap 26 can bind.

While the invention has been described in connection with what is presently considered to be the most practical and preferred embodiment, it is to be understood that the invention is not to be limited to the disclosed embodiment, but, on the contrary, it is intended to cover various modifications and equivalent arrangements included within the spirit and scope of the appended claims. Thus, it is to be understood that variations in the particular parameters used in defining the no mar depth stop of the present invention can be made without departing from the novel aspects of this invention as defined in the claims.

What is claimed is:

1. A depth stop for selective attachment to a cutting tool to regulate tool depth, said depth stop comprising:
   a cylindrical sleeve body having an annular end face and an aperture defined axially therethrough for selectively receiving the cutting tool;
   means for selectively detachably fixing said body to the cutting tool at a selected longitudinal position along the cutting tool so that said body is not rotatable with respect to the cutting tool;
   a cap mounted to said body so as to cover at least a portion of said end face and so as to be rotatable with respect to said body about an axis of rotation of the cutting tool, said cap being formed from a polymer having a low coefficient of friction; and
   an annular ring disposed between said cap and said end face.

2. The depth stop of claim 1 wherein said means for detachably fixing said body to the cutting tool comprises a set screw extending radially through a threaded aperture formed in said body.

3. The depth stop of claim 1 wherein said body is formed from stainless steel.

4. The depth stop of claim 1 wherein said body is formed from brass.

5. The depth stop of claim 1 wherein said cap is formed from a polymer having a coefficient of friction in the range of 0.04 to 0.10.

6. The depth stop of claim 1 wherein said cap is nylon.

7. The depth stop of claim 1 wherein said annular ring comprises a washer.

8. The depth stop of claim 7 wherein said washer is formed from a polymer having a low coefficient of friction.

9. The depth stop of claim 8 wherein said washer is formed from a polymer having a coefficient of friction in the range of 0.04 to 0.10.

10. The depth stop of claim 8 wherein said washer is nylon.

11. The depth stop of claim 1 wherein a one of said cap and said body has a circumferential groove formed on a periphery thereof and the other of said cap and said body has a flange seated in said groove to rotatably mount said cap to said body.

12. The depth stop of claim 11 wherein said circumferential groove is formed on an outer periphery of said body and said flange is formed on an inner periphery of said cap.

13. The depth stop of claim 11 wherein said flange is continuous.

14. The depth stop of claim 1 wherein said cutting tool is a drill bit.

15. The depth stop of claim 11 wherein said flange and said groove are formed so that said flange has a noninterfering fit within said groove so that when an axial force is applied on said cap toward said body, said flange does not contact side surfaces of said groove.

16. A depth stop for selective attachment to a cutting tool to regulate tool depth, said depth stop comprising:
   a cylindrical sleeve body having an annular end face and an aperture defined axially therethrough for selectively receiving the cutting tool;
   means for selectively detachably fixing said body to the cutting tool at a selected longitudinal position along the cutting tool so that said body is not rotatable with respect to the cutting tool;
   a cap mounted to said body so as to cover at least a portion of said end face and so as to be rotatable with respect to said body about an axis of rotation of the cutting and a washer disposed between said cap and said end face.

17. A depth stop for selective attachment to a cutting tool to regulate tool depth, said depth stop comprising:

- a cylindrical sleeve body having an annular end face and an aperture defined axially therethrough for selectively receiving the cutting tool;
- means for selectively detachably fixing said body to the cutting tool at a selected longitudinal position along the cutting tool so that said body is not rotatable with respect to the cutting tool;
- a cap mounted to said body so as to cover at least a portion of said end face and so as to be rotatable with respect to said body about an axis of rotation of the cutting tool, a one of said cap and said body having a circumferential groove formed on a periphery thereof and the other of said cap and said body having a flange seated in said groove to rotatably mount said cap to said body; and
- an annular ring disposed between said cap and said end face.

18. A depth stop for selective attachment to a cutting tool to regulate tool depth, said depth stop comprising:

- a cylindrical stainless steel sleeve body having an annular end face and an aperture defined axially therethrough for selectively receiving the cutting tool;
- means for selectively detachably fixing said body to the cutting tool at a selected longitudinal position along the cutting tool so that said body is not rotatable with respect to the cutting tool; and
- a cap mounted to said body so as to cover at least a portion of said end face and so as to be rotatable with respect to said body about an axis of rotation of the cutting tool, wherein a one of said cap and said body has a circumferential groove formed on a periphery thereof and the other of said cap and said body has a flange seated in said groove to rotatably mount said cap to said body.

19. The depth stop of claim 1, wherein said sleeve body is formed from stainless steel.

20. The depth stop of claim 16, wherein said sleeve body is formed from stainless steel.

* * * * *

UNITED STATES PATENT AND TRADEMARK OFFICE
CERTIFICATE OF CORRECTION

PATENT NO. : 5,795,110
DATED : August 18, 1998
INVENTOR(S) : Wirth et al

It is certified that error appears in the above-identified patent and that said Letters Patent is hereby corrected as shown below:

ON THE TITLE PAGE:

" [75] Inventors: John Wirth, Jr.; Jay L. Sanger; Mark K. McCool,
all of Casper, Wyo."

should be

--[75] Inventors: John Wirth, Jr.; Jay L. Sanger; Mark K. McCool;
Paul J. Brutsman, all of Casper, Wyo.--

Signed and Sealed this

Nineteenth Day of January, 1999

Attest:

Attesting Officer

*Acting Commissioner of Patents and Trademarks*